United States Patent [19]
Goto et al.

[11] Patent Number: 6,122,152
[45] Date of Patent: Sep. 19, 2000

[54] INFORMATION PROCESSING DEVICE

[75] Inventors: Katsuichi Goto; Sonomasa Kobayashi; Yukiya Kojima; Taiji Mizunaga; Takumi Kishi, all of Kawasaki, Japan

[73] Assignee: Fujitsu Limited, Kawasaki, Japan

[21] Appl. No.: 09/267,400

[22] Filed: Mar. 15, 1999

[30] Foreign Application Priority Data

| Mar. 16, 1998 | [JP] | Japan | 10-065035 |
| Mar. 4, 1999 | [JP] | Japan | 11-057220 |

[51] Int. Cl.[7] .................................................. H05K 5/00
[52] U.S. Cl. ............................. 361/1; 361/680; 361/681; 307/116
[58] Field of Search .................................. 361/1, 680, 681; 307/116

[56] References Cited

U.S. PATENT DOCUMENTS

| 5,198,966 | 3/1993 | Kobayashi et al. | 361/681 |
| 5,255,154 | 10/1993 | Hosoi et al. | 361/680 |
| 5,400,213 | 3/1995 | Honda et al. | 361/680 |
| 5,497,296 | 3/1996 | Satou et al. | 361/681 |

FOREIGN PATENT DOCUMENTS

| 61-265789 | 11/1986 | Japan . |
| 5-40536 | 2/1993 | Japan . |
| 8-65181 | 3/1996 | Japan . |

*Primary Examiner*—Michael J. Sherry
*Attorney, Agent, or Firm*—Armstrong, Westerman, Hattori, McLeland & Naughton

[57] ABSTRACT

An information processing device suitable for portable use. The information processing device includes a first member (e.g., a cover having a display unit), a second member (e.g., a body having a keyboard unit), a connecting member for connecting the first and second members so that these members can be relatively displaced, and a switch mechanism provided in the second member. The second member has an engaging portion (e.g., a hole), and the first member includes a hook member to be engaged with the engaging portion. The switch mechanism functions to switch on and off a signal in synchronism with movement of the hook member. According to the structure having such switch mechanism, it can be possible to provide a device which can prevent an improper switching operation.

47 Claims, 14 Drawing Sheets

INFORMATION PROCESSING DEVICE

BACKGROUND OF THE INVENTION

1. Field of the Invention

The present invention relates to an improvement in an information processing device or an electronic device suitable for portable use.

2. Description of the Related Art

Known as an information processing device suitable for portable use is a device including a first member (e.g., a cover having a display unit), a second member (e.g., a body having a keyboard unit), and a connecting member for connecting the first and second members. A closed condition of the first member with respect to the second member is suitable for protection of the keyboard unit and the display unit in carrying the device, and an open condition of the first member with respect to the second member is suitable for use of the device by the use of the keyboard unit and/or the display unit.

A conventional simple hook mechanism applicable to such a device includes a displaceable hook member provided in one of the first and second members and a hole formed in the other for engaging the hook member. By engaging the hook member into the hole in the closed condition of the first member with respect to the second member, the closed condition can be maintained to thereby facilitate carriage of the device. By disengaging the hook member from the hole, the first member can be opened with respect to the second member.

In recent years, an information processing device allowing input with a stylus has been put to practical use. In this device, a transparent touch panel is provided on a display unit. By making contact of the tip of the stylus with the touch panel, inputting from the display unit is performed or inputting from a keyboard unit is assisted.

As another method for inputting with a stylus, the use of an electromagnetic induction digitizer is also known. In this case, the electromagnetic induction digitizer capable of sensing magnetism is located under an LCD (liquid crystal display). When the stylus is brought into contact with the LCD or a transparent plate for protecting the LCD, the stylus generates magnetism. By detecting the magnetism generated from the stylus with the digitizer, coordinate inputting is carried out.

In the case of inputting with a stylus only, there is a possibility that the inputting may be difficult in the open condition of the first member having the display unit with respect to the second member. In this respect, if the first member has a first surface and a second surface, and the display unit is provided on the first surface, it is convenient to obtain a first condition where the first surface is opposed to the second member and a second condition where the second surface is opposed to the second member. That is, both in the first condition and in the second condition, the first member is closed with respect to the second member, and in the second condition the display unit is oriented outward of the device, thereby facilitating the inputting with the touch panel and the stylus.

To obtain the first and second conditions, the connecting member for connecting the first and second members may be improved. The improved connecting member include two parallel shafts each for rotatably supporting the first member or two orthogonal shafts each for rotatably supporting the first member.

In the above-mentioned information processing device with the first member that can be opened and closed with respect to the second member, there is a case that a signal is switched on and off in synchronism with the opening and closing operations of the first member with respect to the second member for the purpose of simplification of operation by a user, etc. For example, in the case that a backlight for the display unit is provided in the first member, a signal for the backlight is automatically switched on when opening the first member with respect to the second member, whereas the signal is automatically switched off when closing the first member with respect to the second member.

Known as a technique for allowing such switching in synchronism with the opening and closing operations is a switch mechanism having a switch member retractably projecting from a small hole formed in a surface of the second member to be opposed to the first member. The switch member is normally biased to project outward of the second member, so that in synchronism with the opening and closing operations of the first member the switch member can be projected and retracted to thereby switch on and off a signal for backlighting or the like.

However, such a conventional switch mechanism has a problem such that if the user erroneously depresses the switch member or if the device is placed on a flat surface such as a desktop with the switch member directed downward in the open condition of the first member with respect to the second member, the switch mechanism may improperly operate.

SUMMARY OF THE INVENTION

It is therefore an object of the present invention to provide an information processing device suitable for portable use which can prevent an improper switching operation.

The other objects of the present invention will become apparent from the following description.

According to the present invention, there is provided an information processing device comprising first and second members, a connecting member (connecting means) for connecting the first and second members so that these members can be relatively displaced, and a switch mechanism (switching means or outputting unit) provided in the second member. The second member has a an engaging portion (or a hole). The first member has a hook mechanism for maintaining a closed condition of the first member with respect to the second member. The hook mechanism includes a hook member to be engaged with the engaging portion (or hole) of the second member. The switch mechanism functions to switch on and off a signal in synchronism with movement of the hook member.

In the information processing device according to the present invention, the hook mechanism having a specific configuration adapted to the engaging portion (or hole) of the second member is adopted. Accordingly, the switch mechanism is operated to switch on and off a signal in response to the operation of the hook mechanism, thereby preventing an improper switching operation. That is, since the hook member of the hook mechanism is adapted to be engage the engaging portion (or hole) of the second member, and the switch mechanism is provided inside the second member, it is difficult for the user to operate the switch mechanism without operating the hook mechanism, thus eliminating the possibility of an improper switching operation due to erroneous depression of the switch member by the user as in the prior art.

According to the present invention, there is provided an electronic device comprising a first member having a display portion, a second member having an input portion, a connecting mechanism connecting the first and second members so that the first and second members can be relatively displaced, and allowing the first and second members to be closed with respect to each other in a condition where the display portion and the input portion are opposed to each other, an engaging mechanism maintaining a closed condition of the first member with respect to the second member; and a outputting unit outputting a signal in accordance with movement of the engaging mechanism. In the electronic device according to the present invention the signal is outputted in accordance with movement of the engaging mechanism which is for maintaining a closed condition of the first member with respect to the second member. Therefore, it is difficult for the user to operate the outputting unit without operating the engaging mechanism, then an improper operation in the prior art is eliminated.

According to the present invention, there is provided an electronic device comprising a first member having a first surface and a second surface, a second member having a third surface and a fourth surface, a connecting mechanism connecting the first and second members so that the first and second members can be relatively displaced between a first condition where said first surface is opposed to the third surface and a second condition where the second surface is opposed to the third surface and a second condition where the second surface is opposed to the fourth surface, and engaging mechanism for maintaining a closed condition of the first member with respect to the second member; and a outputting unit outputting a signal in accordance with movement of the engaging mechanism which is for maintaining a closed condition of the first member with respect to the second member. Therefore, it is difficult for the user to operate the outputting unit without operating the engaging mechanism, then an improper operation in the prior art is eliminated.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
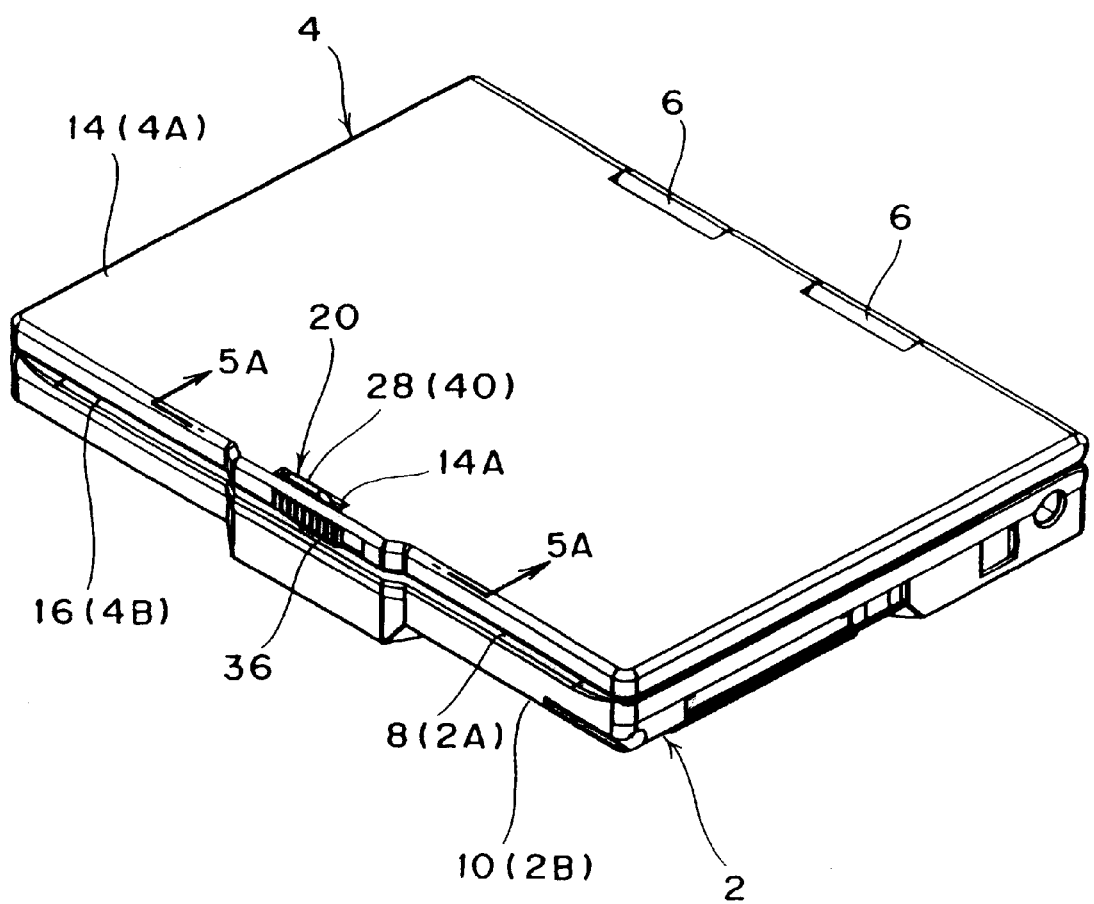
FIG. 1 is a perspective view showing a first condition in a preferred embodiment of the information processing device according to the present invention.
Figure 2:
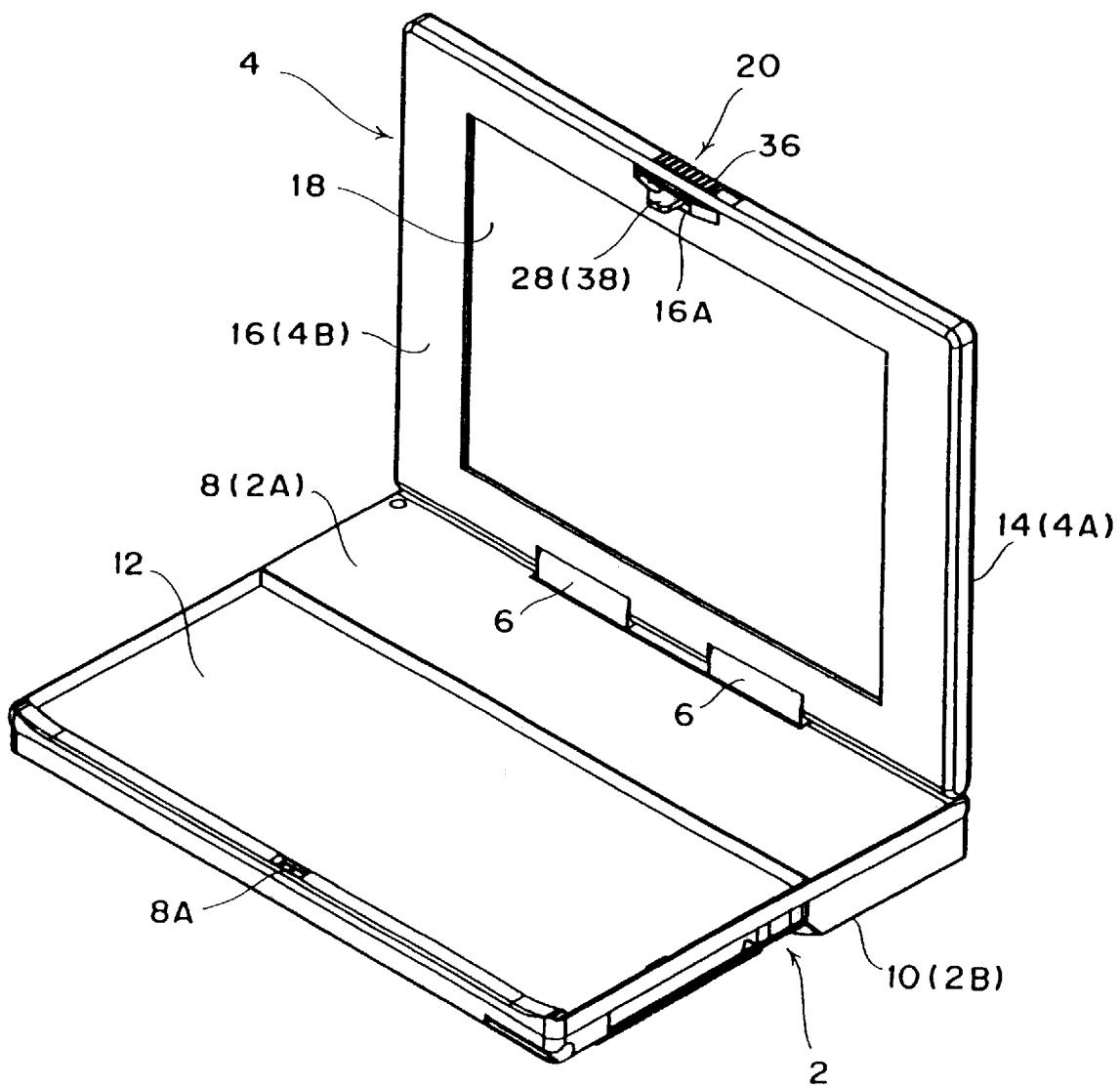
FIG. 2 is a perspective view showing a condition between the first condition and a second condition in the preferred embodiment of the information processing device according to the present invention.
Figure 3:
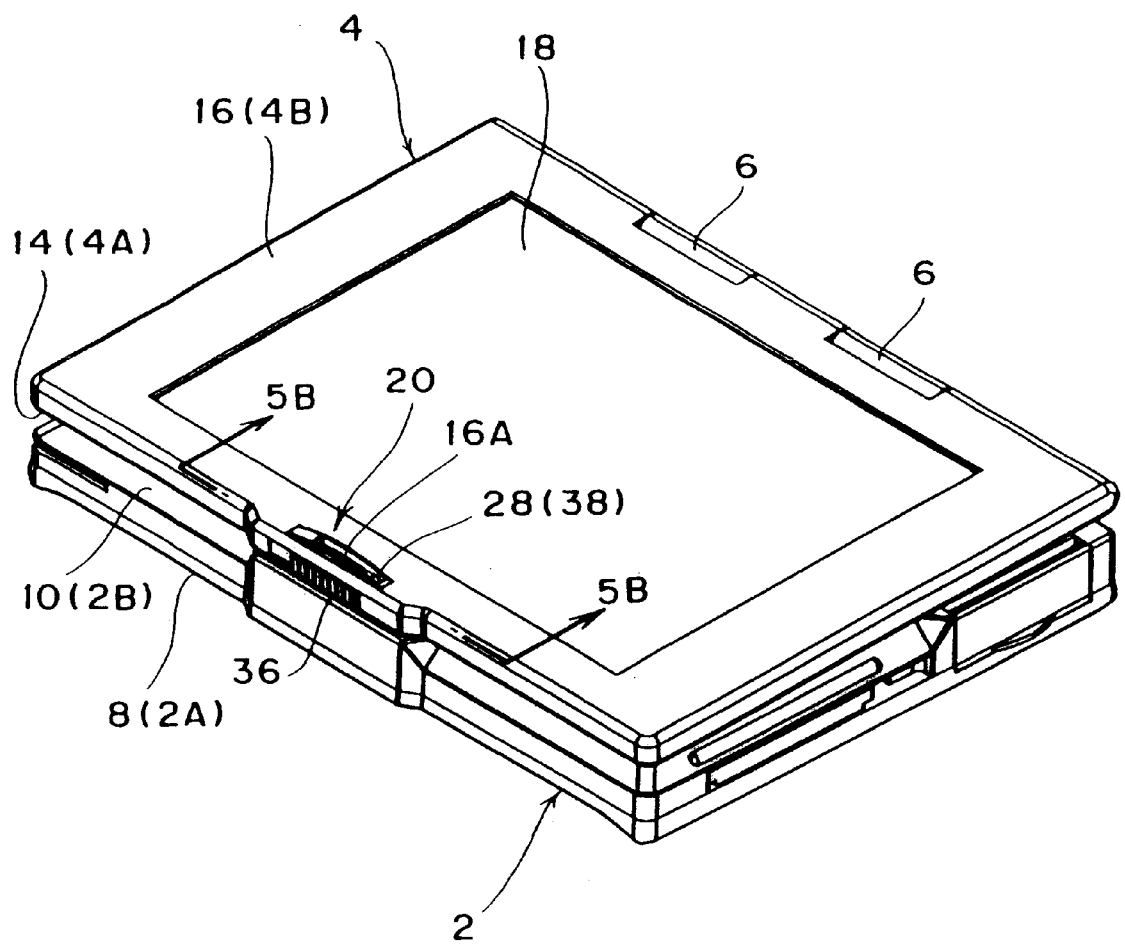
FIG. 3 is a perspective view showing the second condition in the preferred embodiment of the information processing device according to the present invention.

FIGS. 1 to 3 are perspective views showing a preferred embodiment of the information processing device according to the present invention. Possible examples of this device are a laptop, notebook, and other portable information processing devices (personal computers, word processors, etc.). This device includes a body (corresponding to the second member) 2, a cover (corresponding to the first member) 4, and a connecting member 6 for connecting the body 2 and the cover 4 so that these members 2 and 4 can be relatively displaced. The connecting member 6 constitutes a connecting mechanism of this device. The body 2 includes an upper housing 8 and a lower housing 10 for respectively providing an upper surface 2A and a lower surface 2B. The upper housing 8 is provided with a keyboard unit 12 for data inputting or the like. That is, the upper surface 2A of the body 2 has the keyboard unit 12. The keyboard unit 12 constitutes an input device or an input portion of this device.

The words of "upper" and "lower" used in this specification are defined in accordance with the condition of the device shown in FIG. 1.

The cover 4 includes an upper housing 14 and a lower housing 16 for respectively providing an upper surface 4A and a lower surface 4B of the cover 4. The lower housing 16 of the cover 4 is provided with a display unit 18 for displaying and stylus inputting. That is, the lower surface 4B of the cover 4 has the display unit 18. For example, the display unit 18 has an LCD (liquid crystal display) panel and a transparent touch panel provided on the LCD panel. The display unit 18 constitutes a display device, a display portion, or a touch input device of this device.

As another method for inputting data with a stylus, a method using an electromagnetic induction digitizer may be adopted. In this case, the electromagnetic induction digitizer capable of sensing magnetism is located under an LCD. When the stylus is brought into contact with the LCD or a transparent plate for protecting the LCD, the stylus generates magnetism. By utilizing the fact that the digitizer detects the magnetism generated from the stylus, coordinates inputting is performed.

To releasably maintain a closed condition of the cover 4 with respect to the body 2, the cover 4 has a hook mechanism 20. The hook mechanism 20 constitutes an engaging mechanism of this device. Each of the body 2 and the cover 4 is in the form of substantially rectangular plate, and the hook mechanism 20 is located at an end portion of the cover 4 opposite to the connecting member 6. The reason of such location of the hook mechanism 20 is to minimize a force acting on the hook mechanism 20 required to maintain the closed condition of the cover 4 with respect to the body 2. The configuration and operation of the hook mechanism 20 will be hereinafter described in detail.

Figure 4:
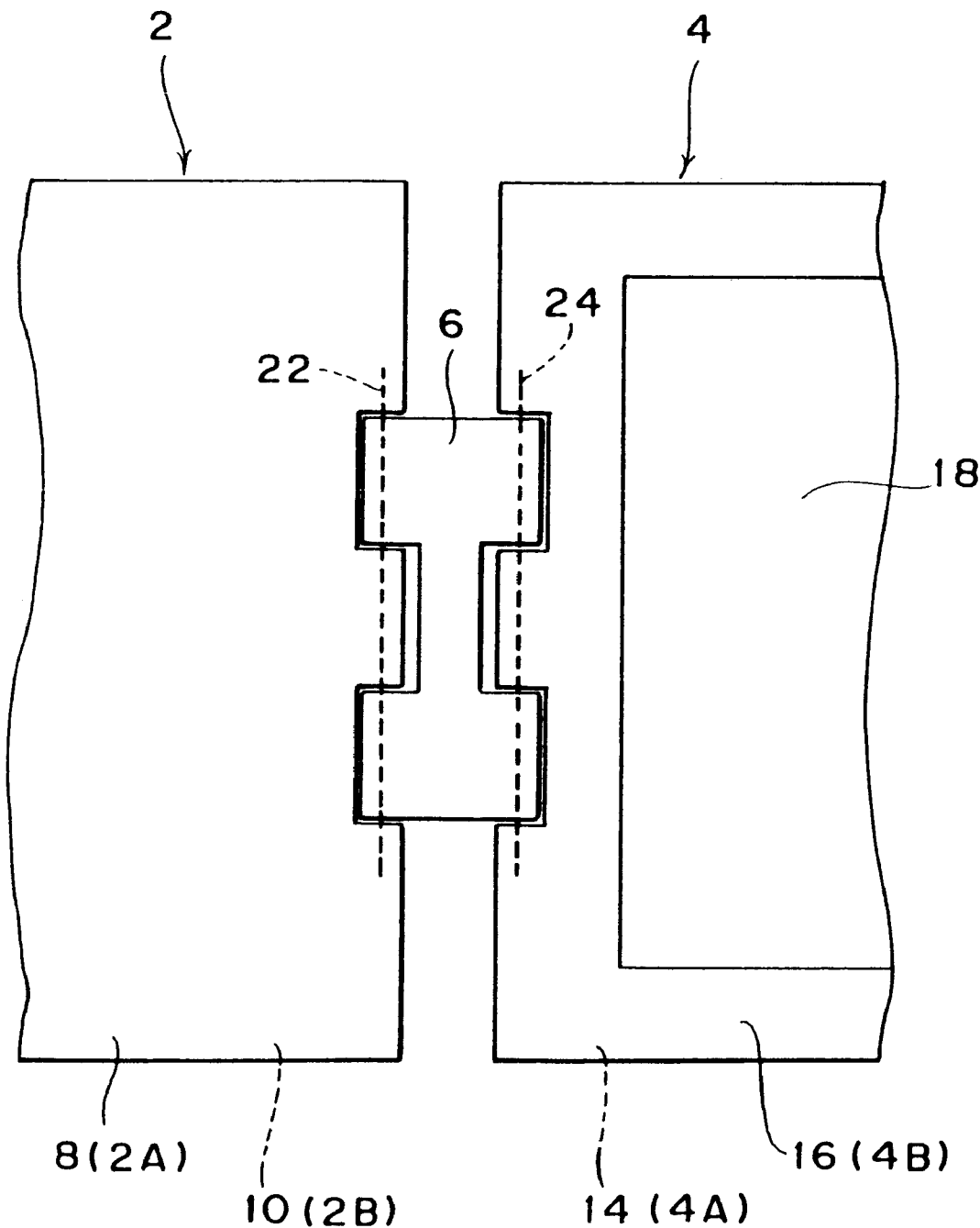
FIG. 4 is a plan view of a connecting member applicable to the present invention.

As best shown in FIG. 4, the connecting member 6 in this preferred embodiment has a simple configuration such that it has two parallel shafts(or axes) 22 and 24 each for rotatably supporting the cover 4 relative to the body 2. More specifically, the shaft 22 allows about 180° rotation of the connecting member 6 relative to the body 2, and the shaft 24 allows about 180° rotation of the cover 4 relative to the connecting member 6. As a result, the cover 4 is rotatable relative to the body 2 in the range of about 360°. Each of the shafts 22 and 24 rotatably supports the cover 4 and the body 2. The use of the connecting member 6 allows relative displacement of the body 2 and the cover 4 between a first condition where the cover 4 is closed with respect to the body 2 with the lower surface 4B of the cover 4 opposed to the body 2 as shown in FIG. 1 and a second condition where the cover 4 is closed with respect to the body 2 with the upper surface 4A of the cover 4 opposed to the body 2 as shown in FIG. 3.

In the first condition shown in FIG. 1, the lower surface 4B of the cover 4 is opposed to the upper surface 2A of the body 2. In the second condition shown in FIG. 3, the upper surface 4A of the cover 4 is opposed to the lower surface 2B of the body 2. In the first condition, the keyboard unit 12 and the display unit 18 are confined between the body 2 and the cover 4, thereby allowing protection of the keyboard unit 12 and the display unit 18. In the second condition, the keyboard unit 12 and the display unit 18 are exposed, or oriented outward of the device. Accordingly, when this device is held by an operator's hand or placed on a desktop in the condition that the body 2 is positioned under the cover 4, for example, the display unit 18 is oriented upward, thereby allowing easy inputting with a stylus on the display unit 18 as viewing the display unit 18.

Further, by giving a proper friction to the rotating motion between the connecting member 6 and each of the body 2 and the cover 4, the cover 4 can be maintained in an open condition with respect to the body 2 as shown in FIG. 2 between the first condition and the second condition, thereby allowing easy inputting with the keyboard unit 12 as viewing the display unit 18. Alternatively, inputting with a stylus on the display unit 18 in the condition shown in FIG. 2 may be performed.

Although not shown, the cover 4 may be rotated about 180° from the first condition shown in FIG. 1 to use this device in the condition where the keyboard unit 12 and the display unit 18 are oriented upward.

Figure 5A:
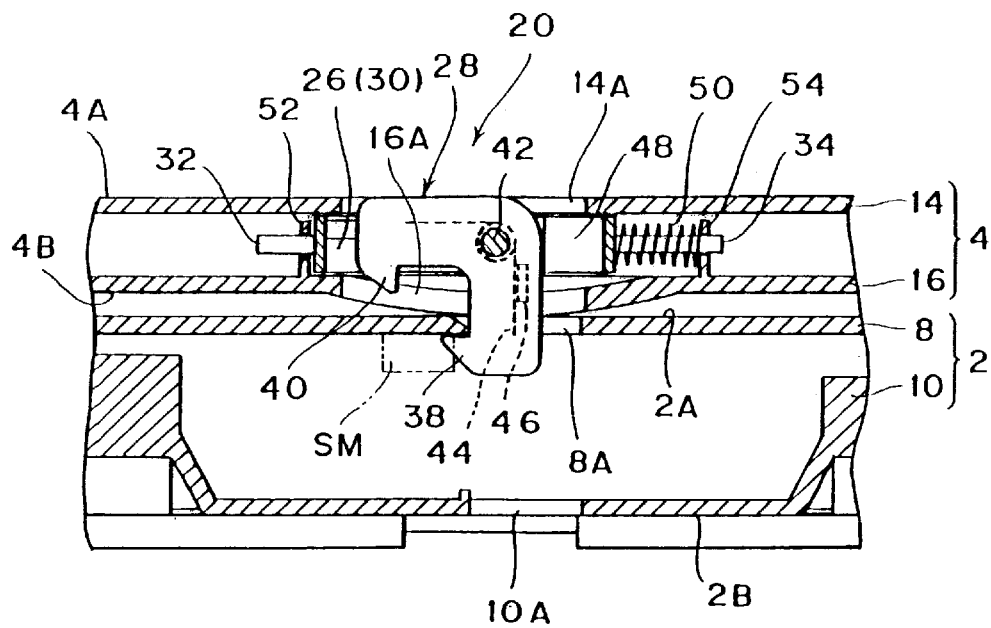
FIG. 5A is a sectional view of a hook mechanism as taken along the line 5A—5A in FIG. 1.
Figure 5B:
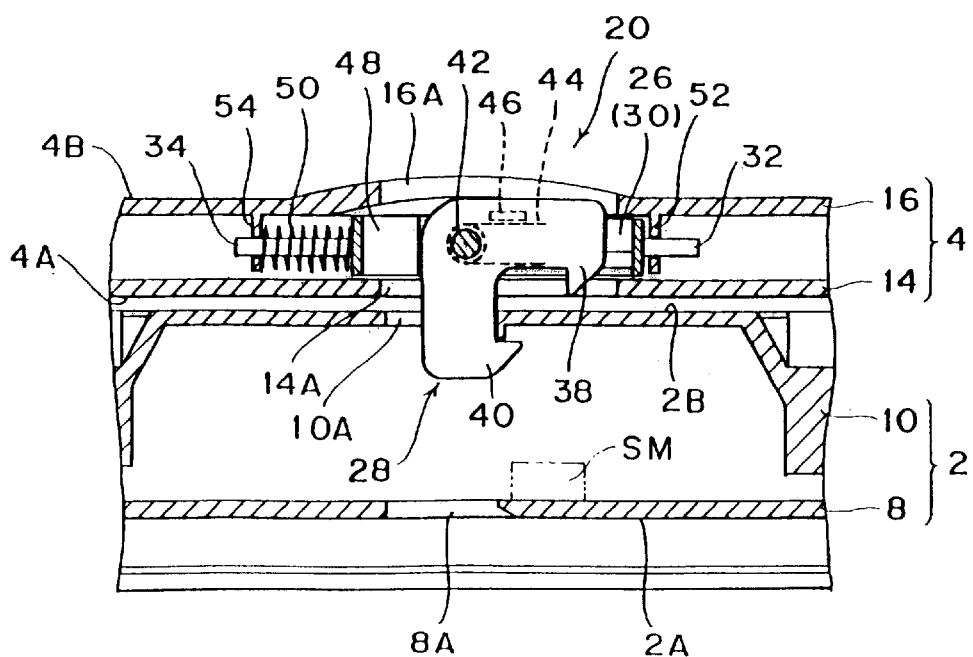
FIG. 5B is a sectional view of the hook mechanism as taken along the line 5B—5B in FIG. 3.

FIG. 5A is a sectional view of the hook mechanism 20 as taken along the line 5A—5A in FIG. 1; FIG. 5B is a sectional view of the hook mechanism 20 as taken along the line 5B—5B in FIG. 3; and FIG. 6 is an exploded perspective view showing an essential part of the hook mechanism 20.

Figure 6:
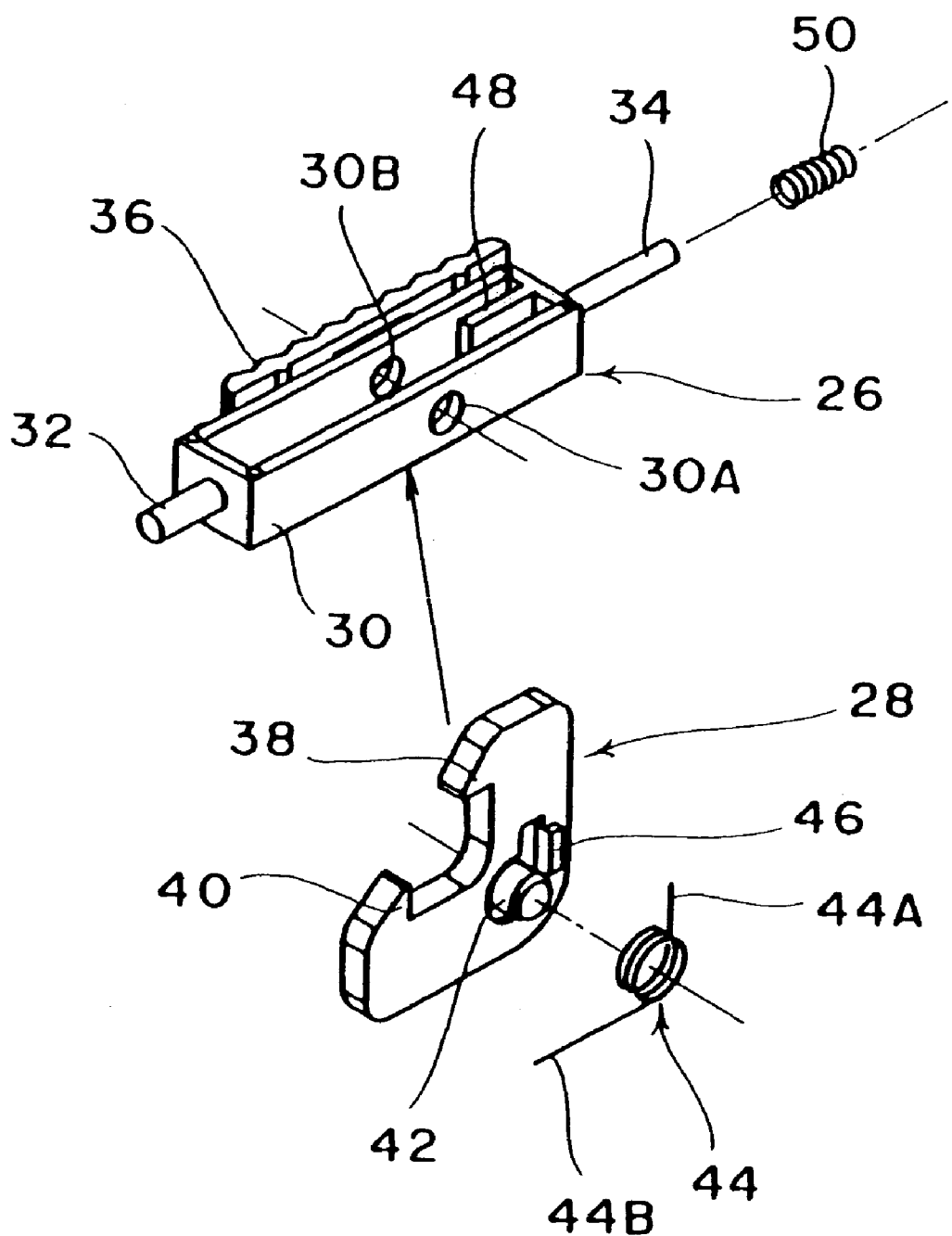
FIG. 6 is an exploded perspective view showing an essential part of the hook mechanism.

As best shown in FIG. 6, the hook mechanism 20 includes a slider 26 and a hook member 28 supported to the slider 26 so as to be rotatable relative thereto in the range of about 90°. The hook member 28 constitutes a first engaging portion of this device. The slider 26 has a boxlike frame 30 open at its upper and lower ends, a shorter sliding shaft 32 projecting outward from one longitudinal end of the frame 30, and a longer sliding shaft 34 projecting outward from the other longitudinal end of the frame 30. A slide button 36 is provided on one side surface of the frame 30. The hook member 28 has a first pawl portion 38 as a first engaging member and a second pawl portion 40 as a second engaging member substantially perpendicular to each other. The first and second pawl portions 38 and 40 are related as an object and its mirror image. The hook member 28 further has a shaft 42 as a center of rotation of the hook member 28 and a projection 46 formed in the vicinity of the shaft 42.

A spring 44 is mounted on the hook member 28 so as to surround a portion of the shaft 42 on one side of the hook member 28. The shaft 42 is inserted at its opposite ends in a pair of holes 30A and 30B formed through the opposite side walls of the frame 30, thereby being rotatably supported to the slider 26. The spring 44 constitutes a biasing member or a biasing portion of this device. A stopper 48 for limiting the rotatable range of the hook member 28 to about 90° is formed on the inside surface of the frame 30. One end 44A of the spring 44 is in abutment against the projection 46 of the hook member 28, and the other end 44B of the spring 44 is in abutment against a shoulder (not shown) formed inside the frame 30. The spring 44 normally exerts an elastic restoring force so as to increase an angle between the one end 44A and the other end 44B, thereby biasing the hook member 28 in a direction where the back of the first pawl portion 38 abuts against the stopper 48. A coil spring 50 is mounted on the longer sliding shaft 34.

As best shown in FIG. 5A, the lower housing 16 of the cover 4 is formed with two slider supports 52 and 54 projecting inside the cover 4. The sliding shafts 32 and 34 of the slider 26 are slidably supported to the slider supports 52 and 54, respectively. Accordingly, the slider 26 is slidable within the cover 4. The coil spring 50 is interposed under compression between the slider support 54 and the frame 30 of the slider 26, and accordingly the coil spring 50 normally biases the slider 26 in a direction from the slider support 54 toward the slider support 52.

The upper housing 14 of the cover 4 has an opening 14A for allowing projection of the second pawl portion 40 of the hook member 28 from the upper surface 4A of the cover 4. The lower housing 16 of the cover 4 has an opening 16A for allowing projection of the first pawl portion 38 of the hook member 28 from the lower surface 4B of the cover 4. A portion of the lower housing 16 surrounding the opening 16A is gently curved outward of the cover 4, thereby obtaining a predetermined spacing between the body 2 and the cover 4 in the first condition. The upper housing 8 of the body 2 has a hole or hole portion 8A for releasably engaging the first pawl portion 38 of the hook member 28. The lower housing 10 of the body 2 has a hole or hole portion 10A for releasably engaging the second pawl portion 40 of the hook member 28. Each of the holes 8A and 10A is a second engaging portion of this device.

The slide button 36 is exposed to the outside of the cover 4 as shown in FIG. 1, for example. The slide button 36 is connected through an opening (not shown) of the cover 4 to the slider 26 provided inside the cover 4. Accordingly, by moving the slide button 36, the slider 26 can be moved from the left to the right as viewed in FIG. 5A against the biasing force of the coil spring 50.

The operation of the hook mechanism 20 when changing the condition shown in FIG. 2 to the first condition shown in FIG. 1 will now be described. In the condition shown in FIG. 2, the back of the first pawl portion 38 of the hook member 28 is pressed on the stopper 48 by the biasing force of the spring 44. Accordingly, the first pawl portion 38 projects from the lower surface 4B of the cover 4 through the opening 16A. In this condition, the second pawl portion 40 of the hook member 28 is positioned inside the cover 4. In closing the cover 4 with respect to the body 2 from the condition shown in FIG. 2 toward the first condition shown in FIG. 1, a taper formed outside the first pawl portion 38 comes into abutment against a taper formed inside the opening 8A, and these tapers slide on each other to convert the direction of a force applied to the hook member 28 by closing the cover 4 toward the body 2 into a direction of slightly compressing the coil spring 50. Then, the tip of the taper of the first pawl portion 38 passes the tip of the taper of the opening 8A to relieve the slight compression of the coil spring 50, thus obtaining the condition shown in FIG. 5A where the inside horizontal surface of the first pawl portion 38 is engaged with the inner surface of the upper housing 8 of the body 2 in the vicinity of the opening 8A. This engagement of the hook member 28 with the opening 8A is maintained by the biasing force of the coil spring 50, thus maintaining the first condition shown in FIG. 1.

In changing the first condition shown in FIG. 1 to the condition shown in FIG. 2, the slide button 36 is moved by the operator to slide the slider 26 against the biasing force of the coil spring 50, that is, compress the coil spring 50. As a result, the first pawl portion 38 of the hook member 28 is disengaged from the opening 8A to thereby allow the first pawl portion 38 to pass through the opening 8A. Accordingly, the cover 4 can be opened with respect to the body 2.

The operation of the hook mechanism 20 when changing the condition shown in FIG. 2 to the second condition shown in FIG. 3 will now be described. In the condition shown in FIG. 2, the back of the first pawl portion 38 is pressed on the stopper 48 by the biasing force of the spring 44, so that the hook member 28 is in a stable condition. By applying a force against the biasing force of the spring 44 to the first pawl portion 38 with the operator's finger, the hook member 28 can be rotated until the back of the second pawl portion 40 comes into abutment against the stopper 48. That is, the hook member 28 is rotated by 90° clockwise from the condition shown in FIG. 5A. As the result of this rotation of the hook member 28, the first pawl portion 38 is retracted into the cover 4, and the second pawl portion 40 is projected from the upper surface 4A of the cover 4 through the opening 14A. In closing the cover 4 with respect to the body 2 toward the second condition shown in FIG. 3 as maintaining the above condition with the opening 16A closed by the operator's finger, the second pawl portion 40 can be engaged with the opening 10A of the lower housing 10 of the body 2 as shown in FIG. 5B in a manner similar to that of the case of obtaining the first condition. Accordingly, the second condition shown in FIG. 3 can be maintained by the hook mechanism 20.

In changing the second condition shown in FIG. 3 to the condition shown in FIG. 2, the slide button 36 is moved by the operator to slide the slider 26 against the biasing force of the coil spring 50, that is, compress the coil spring 50. As a result, the second pawl portion 40 of the hook member 28 is allowed to pass through the opening 10A, so that the cover 4 can be opened. When the cover 4 is separated from the body 2, the biasing force of the spring 44 is relieved, so that the hook member 28 is automatically rotated by 90° counterclockwise as viewed in FIG. 5B to restore the stable condition shown in FIG. 2.

The reason why the hook member 28 is stabilized by using the spring 44 as shown in FIG. 2 is that the operation of closing the cover 4 from the condition shown in FIG. 2 toward the first condition shown in FIG. 1 is usually much more frequent than the operation of closing the cover 4 from the condition shown in FIG. 2 toward the second condition shown in FIG. 3, so that the stable position of the hook member 28 as shown in FIG. 2 is advantageous for the former operation.

It may be proposed to adopt the conventional simple hook mechanism as mentioned above, so as to maintain both the first condition shown in FIG. 1 and the second condition shown in FIG. 3. In this case, however, a first hook mechanism for maintaining the first condition is required, and a second hook mechanism for maintaining the second condition is required, causing a complicated configuration. Furthermore, the second hook mechanism for maintaining the second condition makes an obstruction in the first condition, and the first hook mechanism for maintaining the first condition makes an obstruction in the second condition, causing a deterioration in operability of the device and a poor appearance of the device.

To the contrary, in the hook mechanism 20 provided in the cover 4, the hook member 28 has the first pawl portion 38 and the second pawl portion 40 so that the hook member 28 projects from either the upper surface 4A or the lower surface 4B of the cover 4 in the closed condition thereof into the body 2. Accordingly, by operating the hook mechanism 20 in each of the first and second conditions, the hook member 28 is prevented from projecting outside the device, thereby improving the operability of the device and providing a good appearance of the device.

Further, each of the first and second conditions can be maintained by using the hook mechanism 20, thereby providing an advantage in handling the device.

Further, in the case of inputting with the display unit 18 and a stylus in the condition where the device is held by an operator's hand or placed on a desktop, the stability of the device during operation can be increased to thereby improve the operability, because the second condition shown in FIG. 3 can be maintained by using the hook mechanism 20.

Further, since the hook member 28 as a single member is used commonly to maintain both the first condition and the second condition, the configuration of the device can be made simple as compared with the case of using two simple hook mechanisms as in the prior art.

Further, when each of the first and second conditions is maintained by using the hook mechanism 20, the hook member 28 does not project outside the device, thereby ensuring safety.

Further, since the spring 44 is used to rotate the hook member 28 to its original position, the hook member 28 can be automatically returned to the ready position as shown in FIG. 2, thereby improving the operability and increasing the safety.

In this preferred embodiment, a switch mechanism SM is adopted to switch on and off a signal in synchronism with the opening and closing operations of the cover 4 with respect to the body 2. The switch mechanism SM is provided inside the body 2, so as to prevent an improper switching operation.

This switch mechanism SM operates as an outputting unit outputting a signal in accordance with movement of the engaging mechanism. And this switch mechanism SM is one embodiment or example of the outputting unit.

Particularly in this preferred embodiment, the switch mechanism SM is provided in the vicinity of the hole 8A on the inner surface of the upper housing 8 of the body 2, so as to make the on and off states of a signal correspond to the first condition shown in FIG. 5A and the other conditions. The reason why the switch mechanism SM is provided in the vicinity of the hole 8A is to apply a force by the sliding operation of the hook member 28 to the switch mechanism SM. That is, since this preferred embodiment employs the slider 26 for supporting the hook member 28 slidably in a direction substantially perpendicular to a direction of insertion of the hook member 28 (the first pawl portion 38) into the hole 8A, the switch mechanism SM is operated by a force exerted by the sliding operation of the hook member 28 moving together with the slider 26.

Possible examples of the signal to be switched on and off by the switch mechanism SM are a control signal for the display device or the display portion, a signal for switching on and off a backlight for the display unit 18, for example, a signal for switching on and off a main power of the device, and a signal for performing suspend and resume processing. The switch mechanism SM may include a switch for directly controlling supply of power, or may include a switch for controlling a small signal related to a CPU (central processing unit).

Figure 7A:
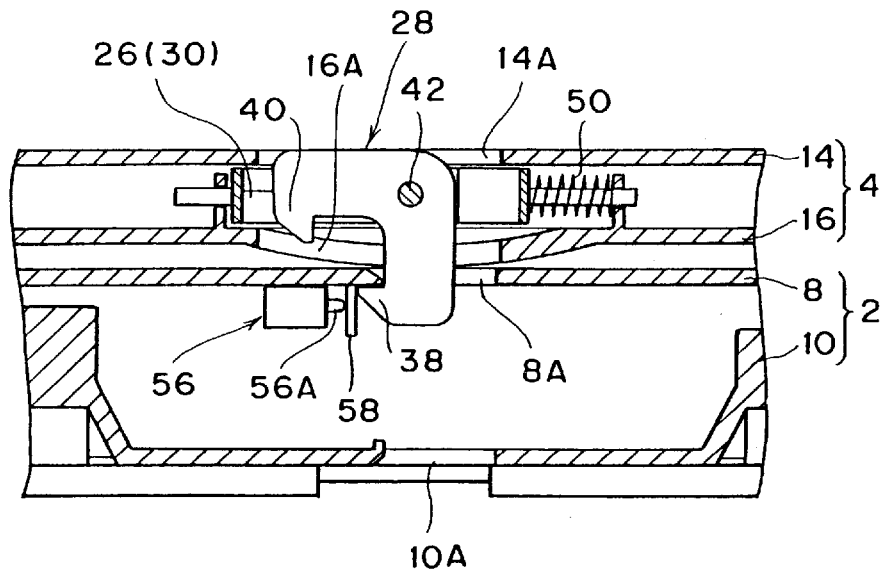
FIGS. 7A and 7B are sectional views showing a first preferred embodiment of a switch mechanism applicable to the present invention.
Figure 7B:
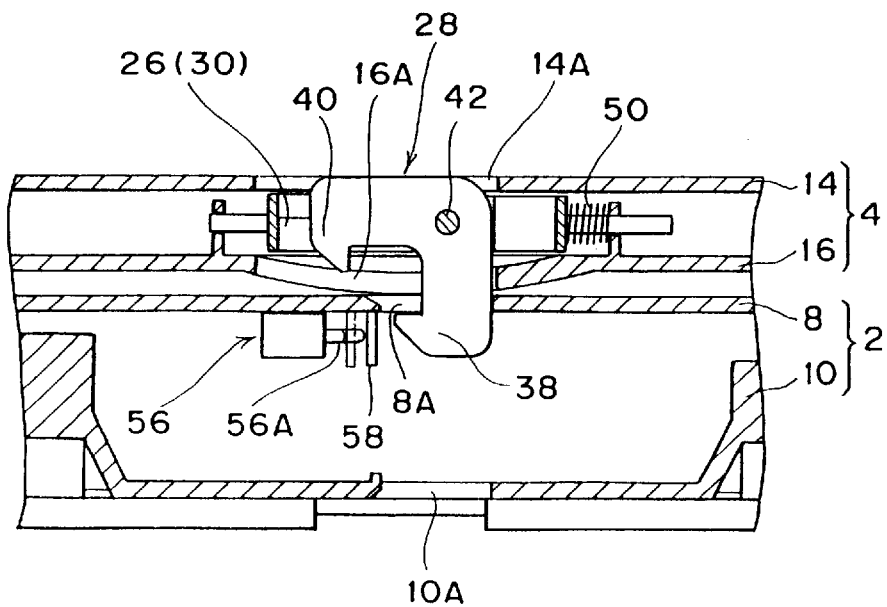

Referring to FIGS. 7A and 7B, there are shown a first preferred embodiment of the switch mechanism or the outputting unit applicable to the present invention. FIG. 7A corresponds to the cross section shown in FIG. 5A, showing a specific configuration of the switch mechanism SM or the outputting unit. FIG. 7B shows a condition where the hook member 28 has been slid rightward as viewed in FIG. 7A by using the slide button 36 (see FIG. 1, for example). The switch mechanism SM shown in FIG. 7A includes a switch 56 having a displaceable switching pin(or switch member) 56A for determining on and off positions, and a movable member 58 for transmitting a force exerted by the sliding operation of the hook member 28 to the switching pin 56A. The switch 56 may be provided by a commercially available microswitch. The switching pin 56A is normally biased by a spring (not shown) provided in the switch 56 so as to project out of the switch 56. Particularly in this preferred embodiment, when the switching pin 56A is depressed as shown in FIG. 7A, the switch 56 becomes off, whereas when the switching pin 56A projects as shown by a solid line in FIG. 7B, the switch 56 becomes on.

The movable member 58 is provided by an elastically deformable plate elongated in a direction perpendicular to the sheet plane of each of FIGS. 7A and 7B. An end portion of the movable member 58 on the back side in this direction is fixed to the body 2, and the other end portion of the movable member 58 on the front side in this direction is displaceable in a horizontal direction as viewed in each of FIGS. 7A and 7B. The reason why the movable member 58 is used in this preferred embodiment is to adapt the sharp tip of the first pawl portion 38 of the hook member 28 to the switching pin 56A. More specifically, when the first pawl portion 38 of the hook member 28 is engaged with the hole 8A to maintain the first condition as shown in FIG. 7A, a force exerted by the sliding operation of the hook member 28, e.g., a force of extension of the coil spring 50, is transmitted through the movable member 58 to the switching pin 56A to depress the switching pin 56A, thereby maintaining the off state of the switch 56. When the hook member 28 is slid rightward by using the slide button 36 as shown in FIG. 7B, or when any condition other than the first condition is obtained as shown in FIG. 2 or 3, a depression force of the hook member 28 to the movable member 58 and the switching pin 56A is removed, so that the switching pin 56A is allowed to project, thereby turning on the switch 56.

Figure 8:
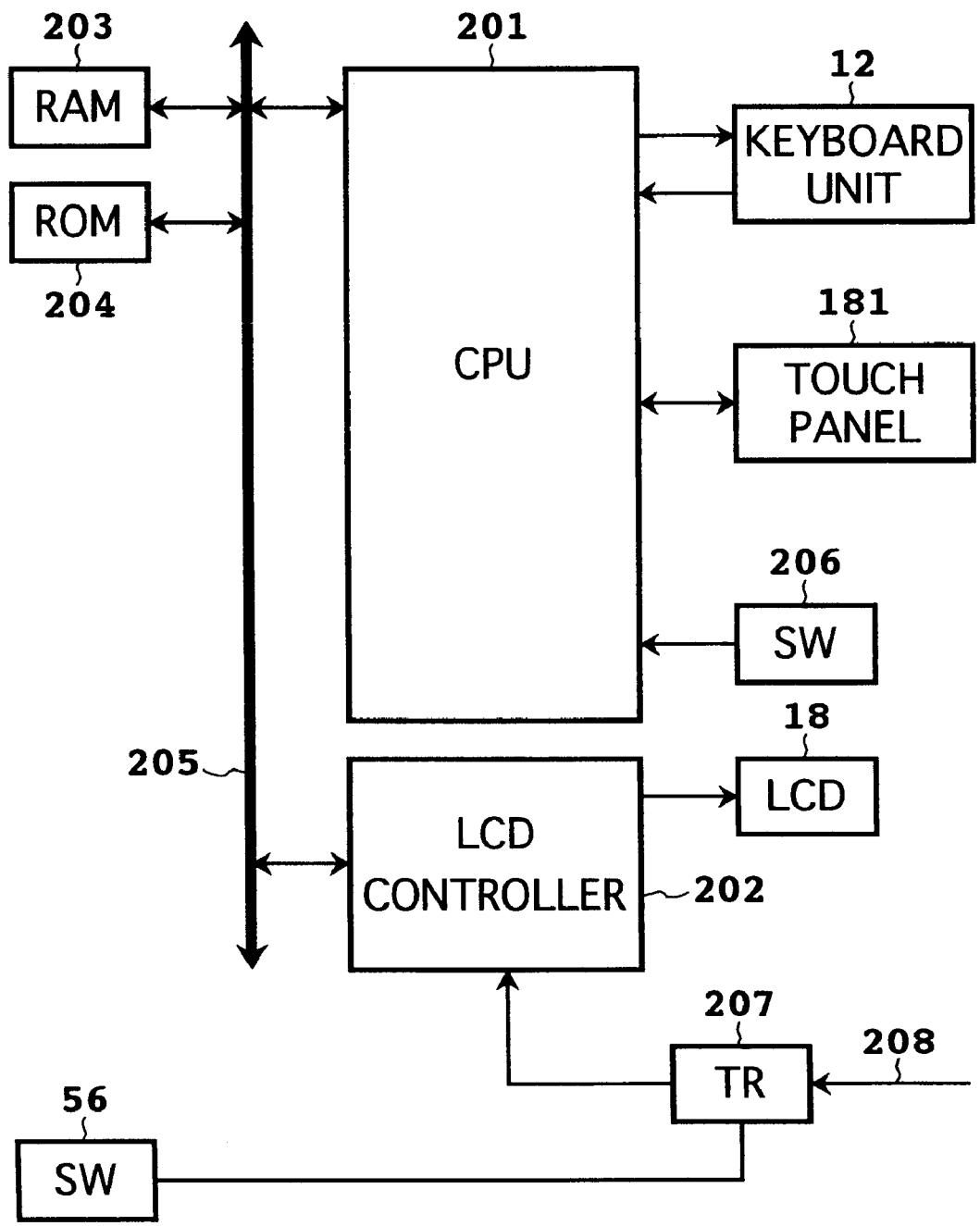
FIG. 8 is a block diagram showing a hardware configuration applicable to the information processing device according to the present invention.

FIG. 8 is a block diagram showing a hardware configuration applicable to the information processing device according to the present invention. A preferred embodiment for controlling a backlight for an LCD will now be described with reference to FIG. 8. The hardware configuration shown in FIG. 8 includes a CPU 201, LCD controller 202, RAM (random access memory) 203, ROM (read-only memory) 204, system bus 205, keyboard unit 12, touch panel 181, main switch 206, transistor 207, and switch 56. The keyboard unit 12, the switch 56, and the display unit (LCD) 18 are the same as those shown in FIGS. 1 to 7. The touch panel 181 is configured by a transparent electrode provided so as to cover the display unit 18. While the touch panel 181 configured by a transparent electrode is used in this preferred embodiment, an electromagnetic induction digitizer may be used instead as mentioned above.

The CPU 201 functions to execute a program stored in the RAM 203 or the ROM 204. The main switch 206 is a main power switch of the device. The LCD controller 202 performs display control of the display unit 18, on/off control of the backlight for the display unit 18, etc. A backlight signal 208 is input through the transistor 207 to the LCD controller 202. When the backlight signal 208 is ON, the LCD controller 202 keeps backlighting for the display unit 18 in an on state. Normally, the backlight signal 208 is ON (the case of turning off this signal will be hereinafter described). When the switch 56 is in a condition where it is not depressed by the hook member 28, the switch 56 applies a voltage to the transistor 207 so as to open the gate of the transistor 207, whereas when the switch 56 is depressed by the hook member 28, the gate of the transistor 207 is closed. Accordingly, when the switch 56 is depressed by the hook member 28, the normally ON backlight signal 208 is cut off, so that the LCD controller 202 turns off the backlight signal 208 applied to the LCD 18. While the on/off control of the backlight signal 208 is carried out in relation to the operation of the switch 56, the backlight signal 208 may be turned off irrespective of the operation of the switch 56 as in the case of suspend and resume processing or using a timer (the backlight signal 208 is turned off for the purpose of power saving after a given period of time has elapsed). In this case, although not shown, the CPU 201 or another processor turns off the backlight signal 208.

Figure 9:
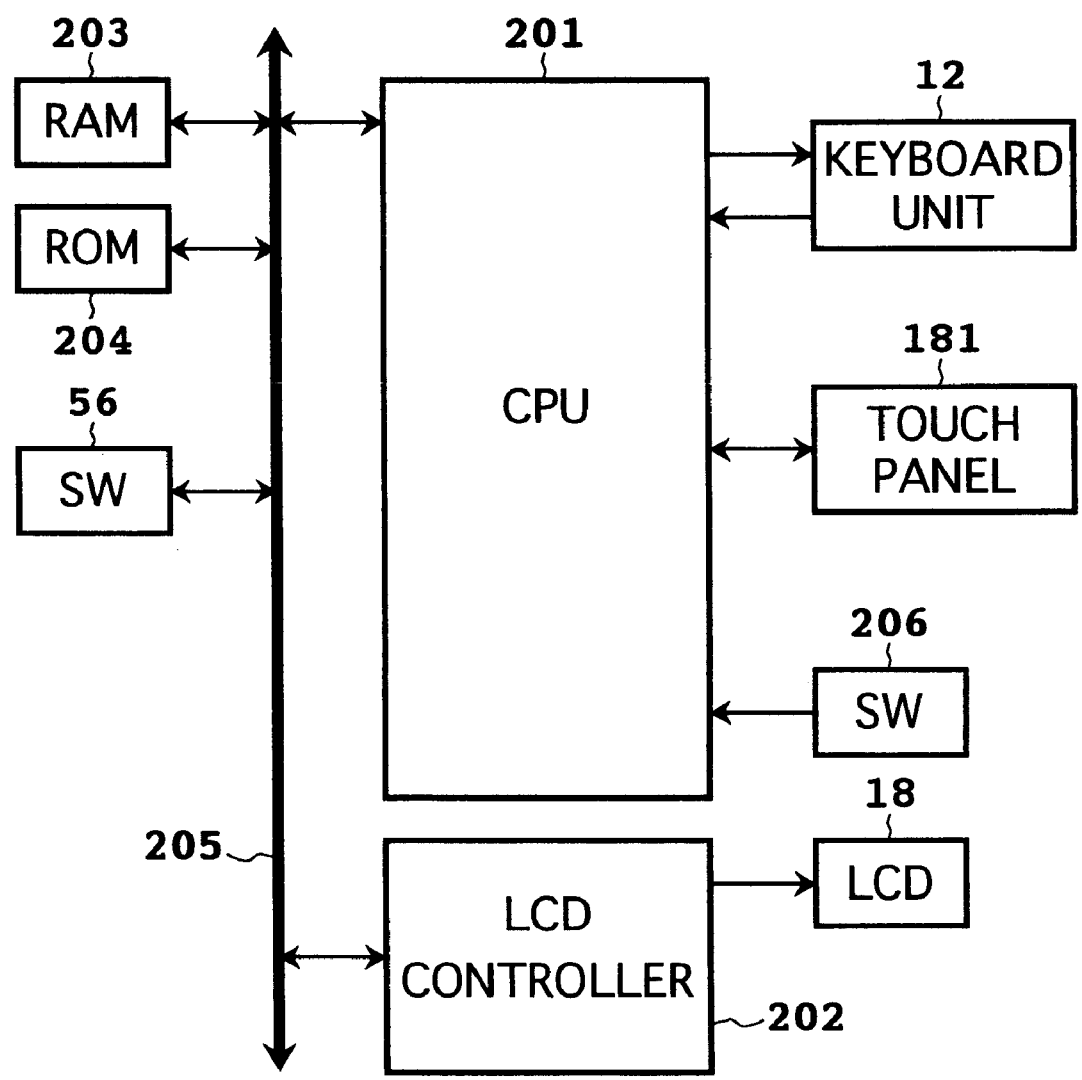
FIG. 9 is a block diagram showing another hardware configuration applicable to the information processing device according to the present invention.

FIG. 9 shows another hardware configuration, in which the same reference numerals as those shown in FIG. 8 denote the same components. In FIG. 9, the switch 56 is connected to the system bus 205. The ROM 204 preliminarily stores a program for performing the operation shown by a flowchart of FIG. 10, and the CPU 201 execute this program.

Figure 10:
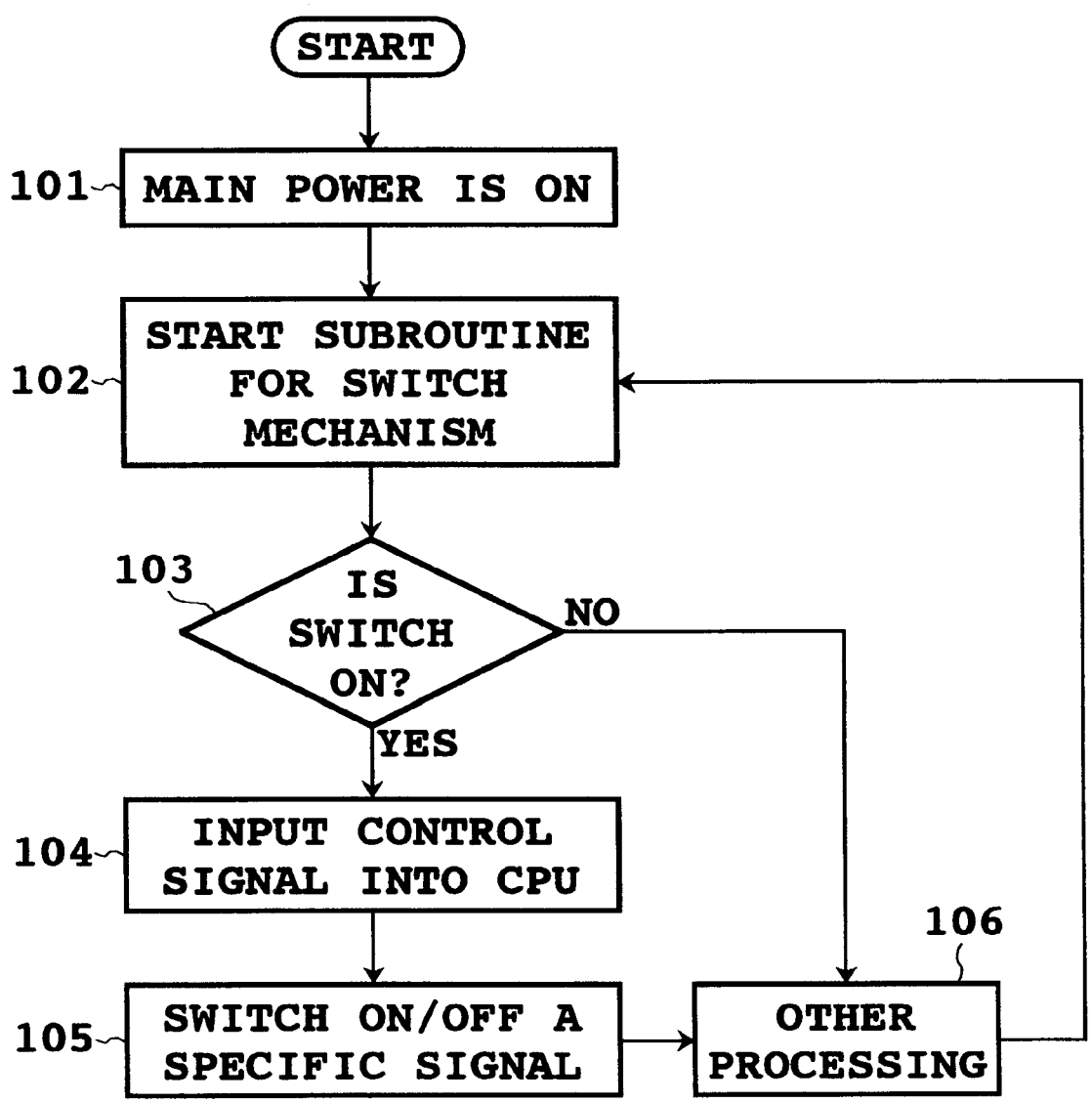
FIG. 10 is a flowchart showing a control operation by the switch mechanism.

FIG. 10 is a flowchart showing the control operation by the switch mechanism SM or the outputting unit in the preferred embodiment shown in FIG. 9. The operation shown in FIG. 10 corresponds to the program stored in the ROM 204 shown in FIG. 9. When the main power (main switch 206) is turned on in step 101, the program proceeds to step 102. In step 102, a subroutine for the switch mechanism SM is started. In step 103, it is determined whether or not the switch 56 is on (whether or not the hook member 28 is inserted in the hole 8A). If the switch 56 is on, the program proceeds to step 104. In step 104, a control signal indicating that the switch 56 is on is input into the CPU 201. In step 105, on/off control of a specific signal (e.g., a signal directing the LCD controller 202 to turn off backlighting) is carried out according to an instruction from the CPU 201. In step 106, other processing is carried out, and the program then returns to step 102. If it is determined in step 103 that the switch 56 is off, the program jumps steps 104 and 105 to proceed to step 106.

Thus according to this preferred embodiment, the switch mechanism SM performs on/off control of a signal in synchronism with the operation of the hook member 28. For example, the backlight can be automatically switched off in the first condition shown in FIG. 1, and can be automatically switched on in the condition shown in FIG. 2 or in the second condition shown in FIG. 3. Accordingly, the operability of the device can be improved and the power consumption can be suppressed.

In the electronic device according to the present invention, the switch mechanism SM as the outputting unit outputs the signal in accordance with the movement of the engaging mechanism including the hook member 28 and the hole 8A. Therefore, it is difficult for the user to operate the outputting unit without the movement of the engaging mechanism, then an improper operation in the prior art is eliminated.

Further, the operator is prohibited from operating the switch mechanism SM without using the hook member 28 in any cases except a willful case and an unavoidable abnormal case due to the entry of foreign matter. Accordingly, an improper switching operation can be prevented.

Figure 11:
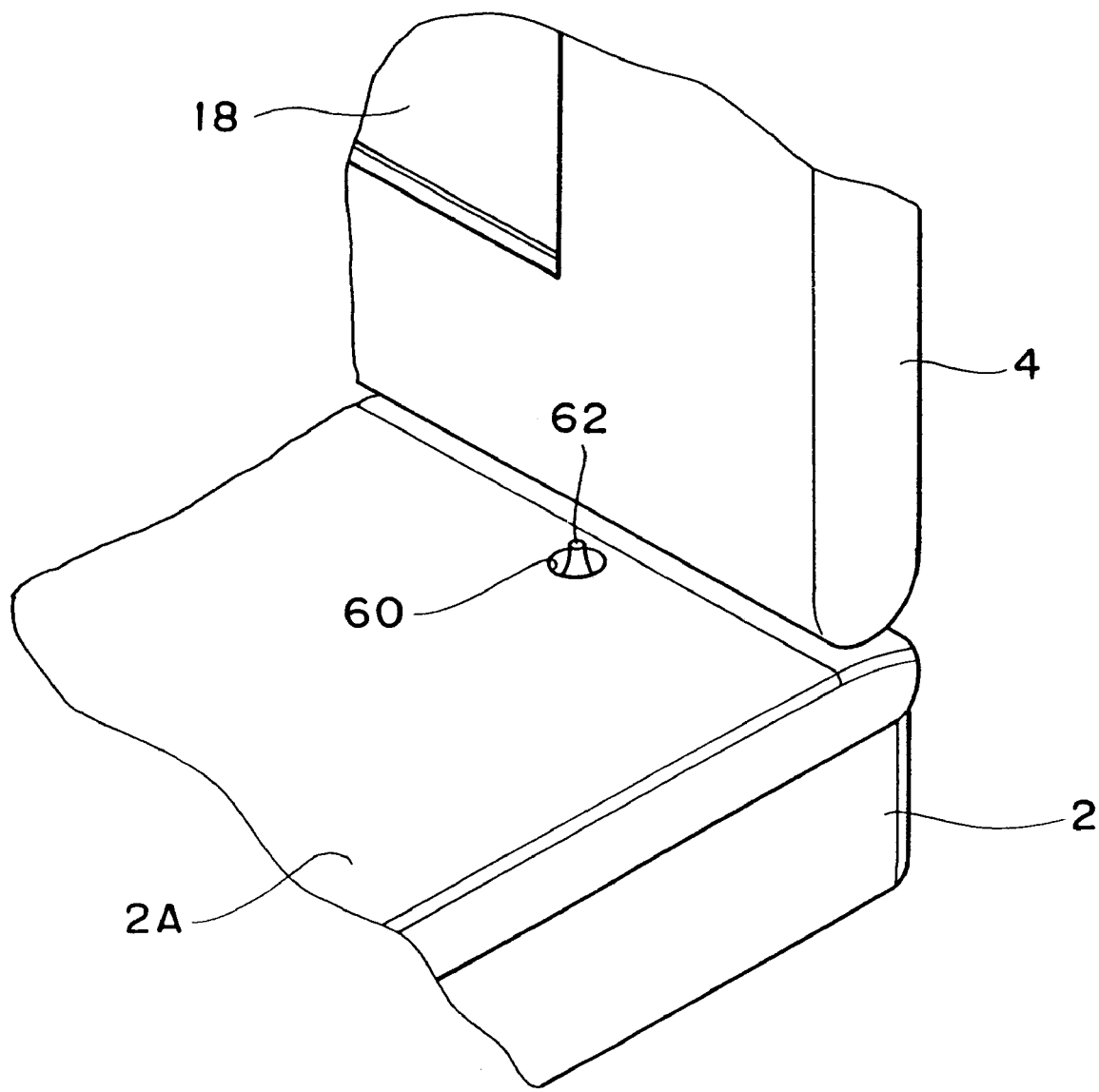
FIG. 11 is a perspective view showing a switch mechanism in the prior art.

FIG. 11 shows a conventional switch mechanism as mentioned previously. This switch mechanism includes a switching pin 62 provided in a small hole 60 formed through the upper surface 2A of the body 2. The switching pin 62 is retractably projected from the upper surface 2A. In this kind of conventional switch mechanism, the operator can directly contact the switching pin 62, so that the operator can operate the switch mechanism irrespective of the opening and closing operations of the cover 4 with respect to the body 2, causing a possibility of an improper switching operation. Further, in the case of inputting with the display unit 18 and a stylus in the condition that the device is placed on a flat surface such as a desktop with the upper surface 2A of the body 2 oriented downward as in the second condition shown in FIG. 3, there is a possibility that the switching pin 62 may be depressed by the weight of the device to undesirably turn off the backlight for the display unit 18, for example.

To the contrary, the switch mechanism SM in this preferred embodiment is completely built in the body 2 to prevent an improper switching operation as mentioned above. Thus, the disadvantages of the conventional switch mechanism can be eliminated.

While the switch mechanism SM is used to perform on/off control of the display unit 18 in the above preferred embodiment, the switch mechanism SM may be applied to a known suspend (resume) function. In general, the suspend function is a function of temporarily stopping a task, and the resume function is a function of restarting the task temporarily stopped. In a personal computer, the suspend (resume) function means a function of cutting off or greatly reducing power supply to devices other than memories. That is, the task is suspended (temporarily stopped) with the personal computer kept in an operative condition. An existing notebook (or portable) personal computer generally employs a function of automatically suspending a task when closing a display. In such an existing device, closing the display is detected by the configuration shown in FIG. 11 to enter a suspended mode. In the present invention, closing the display can be detected by the switch mechanism SM to enter a suspended mode. Further, opening the display from the above closed condition in the suspended mode can also be detected by the switch mechanism SM to resume the task.

According to this preferred embodiment, the operation of the device is not shifted to a suspended mode in the second condition shown in FIG. 3 unlike the case shown in FIG. 11.

Figure 12A:
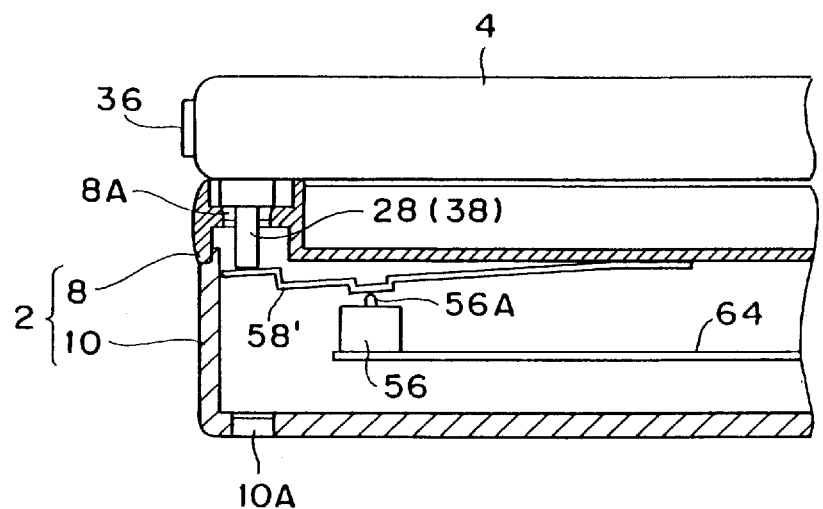
FIGS. 12A and 12B are sectional views showing a second preferred embodiment of the switch mechanism applicable to the present invention.
Figure 12B:
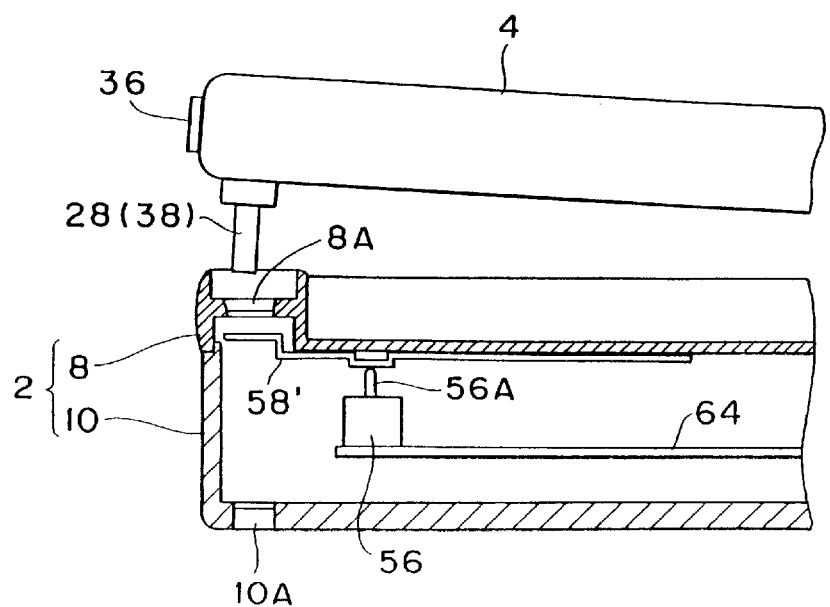

FIGS. 12A and 12B are sectional views showing a second preferred embodiment of the switch mechanism or the outputting unit applicable to the present invention. In this preferred embodiment, the switch 56 is modified in position and orientation to switch on and off a signal in synchronism with insertion of the hook member 28 into the hole 8A. The switch 56 is fixed to a printed wiring board 64 provided in the body 2, and is positioned so that the switching pin 56A is pointed to the upper housing 8 of the body 2. A movable member 58' is fixed to the inner surface of the upper housing 8 of the body 2, so as to transmit to the switching pin 56A a force exerted by the inserting operation of the first pawl portion 38 of the hook member 28 into the hole 8A. More specifically, the movable member 58' is provided by a plate member suitably bent so as to be adapted to a positional relation between the hook member 28 and the switching pin 56A in the first condition. One end of the movable member 58' is fixed to the inner surface of the upper housing 8, and the other end of the movable member 58' is adapted to come into contact with the hook member 28.

In the first condition shown in FIG. 12A, the first pawl portion 38 of the hook member 28 is inserted through the hole 8A to depress the movable member 58', which is elastically deformed to push the switching pin 56A. As a result, the switch 56 is off. When the cover 4 is opened from the first condition to obtain another condition, for example, as shown in FIG. 12B, a depression force of the hook member 28 to the switching pin 56A and the movable member 58' is removed, so that the movable member 58' is returned to the upper housing 8 by its elastic restoring force, and the switching pin 56A projects. As a result, the switch 56 becomes on.

In the electronic device according to the present invention, the switch mechanism SM as the outputting unit outputs the signal in accordance with the movement of the engaging mechanism including the hook member 28 and the hole 8A. Therefore, it is difficult for the user to operate the outputting unit without the movement of the engaging mechanism, then an improper operation in the prior art is eliminated.

Also in this preferred embodiment, the switch mechanism is completely built in the body 2, thereby preventing an improper switching operation. Other technical effects by this preferred embodiment are similar to those by the first preferred embodiment, so the description thereof will be omitted herein.

Figure 13A:
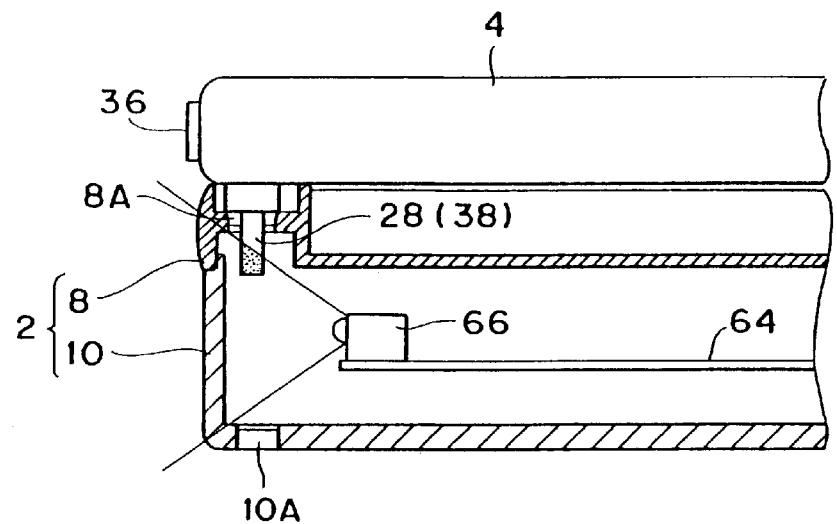
FIGS. 13A and 13B are sectional views showing a third preferred embodiment of the switch mechanism applicable to the present invention.
Figure 13B:
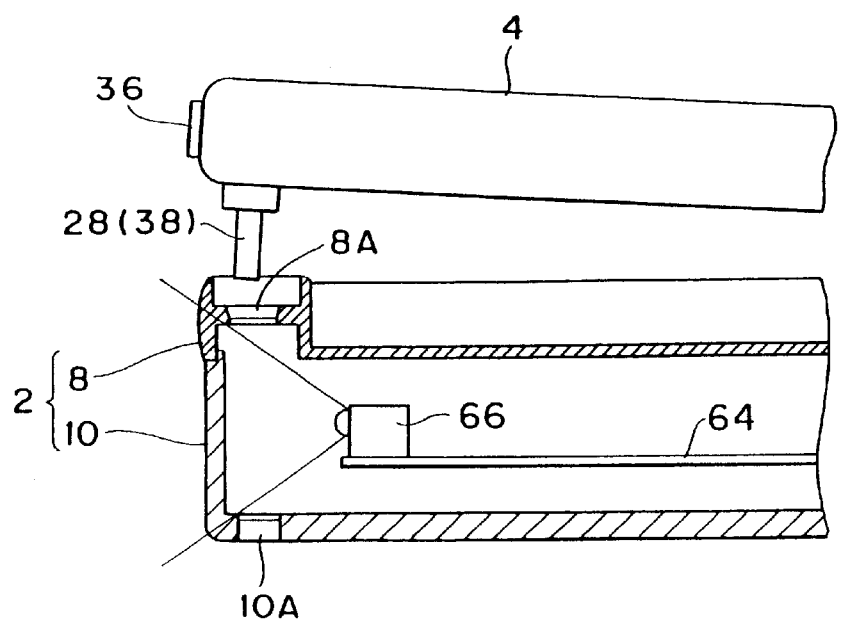

FIGS. 13A and 13B are sectional views showing a third preferred embodiment of the switch mechanism or the outputting unit applicable to the present invention. In this preferred embodiment, the switch mechanism adopts an optical sensor 66 for detecting whether or not the hook member 28 (the first pawl portion 38) is inserted through the hole 8A into the body 2. More specifically, the optical sensor 66 is provided on a printed wiring board 64 at a position facing the hook member 28 inserted. For example, the optical sensor 66 includes a light source for emitting light and a photodetector for detecting the quantity of reflected light (as by irregular reflection) from the hook member 28, thus detecting the hook member 28 inserted according to the quantity of reflected light. To enhance the detection sensitivity, the surface of the first pawl portion 38 of the hook member 28 may be coated with a material having a high reflectivity to the emitted light.

According to this preferred embodiment, the hook member 28 inserted through the hole 8A into the body 2 is detected by the optical sensor 66 provided inside the body 2, thereby preventing an improper switching operation. Further, no mechanical means is required to detect the hook member 28, thereby improving the reliability of on/off control of a signal.

While the optical sensor 66 is used to detect the hook member 28 inserted in this preferred embodiment, a sensor using any electromagnetic radiation other than light may be adopted.

Further, while the switch mechanism or the outputting unit characteristic of the present invention is applied to the device adopting the hook mechanism 20 having a specific configuration for maintaining both the first condition shown in FIG. 1 and the second condition shown in FIG. 3, the present invention is applicable also to a device not adopting the hook mechanism 20.

Figure 14A:
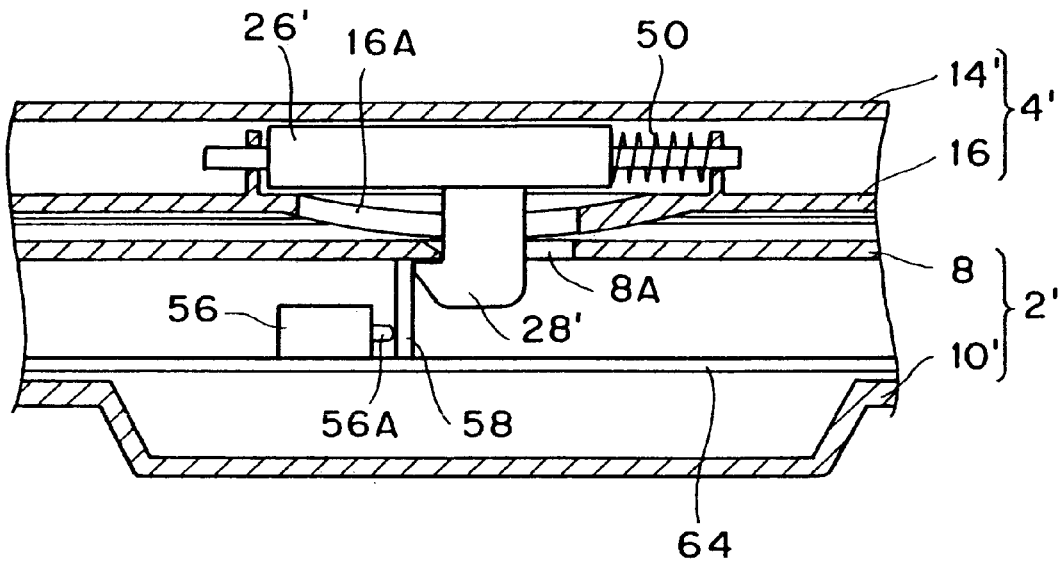
FIGS. 14A and 14B are sectional views showing an essential part of another preferred embodiment of the information processing device according to the present invention.
Figure 14B:
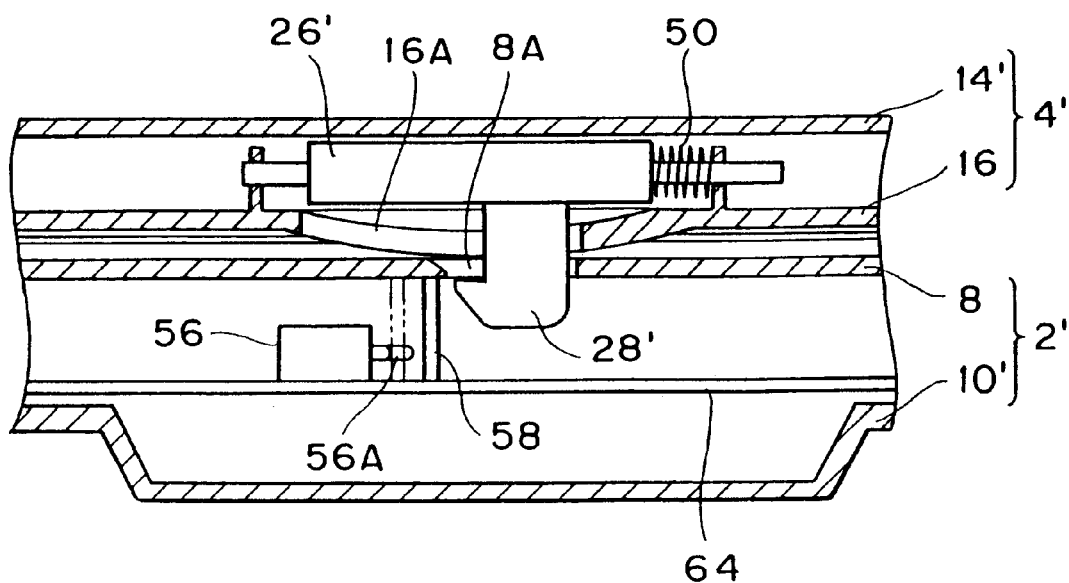

FIGS. 14A and 14B are sectional views showing an essential part of another preferred embodiment of the information processing device according to the present invention. FIGS. 14A and 14B correspond to FIGS. 7A and 7B, respectively. In this preferred embodiment, a simple slider 26' is used and a hook member 28' as the first engaging portion is integral with the slider 26'. The hook member 28' projects downward from the slider 26'. Accordingly, the hook member 28' corresponds to the first pawl portion 38 in each of the previous preferred embodiments. To adapt the device to such a hook mechanism or an engaging mechanism, the device includes a cover 4' having a modified upper housing 14' and a body 2' having a modified lower housing 10'. That is, each of the housings 10' and 14' has no hole for the hook member 28'. By using such a hook mechanism or an engaging mechanism, the first condition as shown in FIG. 1 can be releasably maintained.

The slider 26' supports the hook member 28' slidably in a direction substantially perpendicular to a direction of insertion of the hook member 28' into the hole 8A. Accordingly, to switch on and off a signal in synchronism with the sliding operation of the hook member 28', a switch mechanism including a switch 56 or the outputting unit 56 and a movable member 58 similar to those in the first preferred embodiment is used. The switch 56 is fixed to a printed wiring board 64 provided in the body 2'. By fixing the switch 56 to the printed wiring board 64, electrical wiring for the switch 56 can be made more easily than that in the case of fixing the switch 56 to the inner surface of the upper housing 8.

In the electronic device according to the present invention, the switch mechanism SM as the outputting unit outputs the signal in accordance with the movement of the engaging mechanism including the hook member 28' and the hole 8A. Therefore, it is difficult for the user to operate the outputting unit without the movement of the engaging mechanism, then an improper operation in the prior art is eliminated.

Also according to this preferred embodiment, the switch mechanism is completely built in the body 2', thereby preventing an improper switching operation.

While the present invention is applied to a specific device capable of obtaining the first condition shown in FIG. 1 and the second condition shown in FIG. 3 in the above preferred embodiments, it is to be noted that the present invention is not limited to the above preferred embodiments. For example, the present invention may be applied to an information processing device employing a single shaft(or axis) for connecting a cover to a body without using the connecting member 6 as shown in FIG. 4, wherein the cover is rotatable about 180° relative to the body.

In the above preferred embodiments shown in FIGS. 1 to 10 and 12A to 14B, the members relating to the hook mechanism 20, such as the slider 26 and the hook member 28 are provided on the display unit 18 (cover 4) side, and the members relating to the switch or the outputting unit, such as the switch mechanism SM as well as the engaging portion such as the hole 8A to be engaged with the hook member 28 are provided on the keyboard unit 12 (body 2) side. However, a reverse configuration is also applicable to the present invention. That is, the members relating to the switch or the outputting unit, such as the switch mechanism SM as well as the engaging portion such as the hole 8A to be engaged with the hook member 28 may be provided on the display unit 18 (cover 4) side, and the members relating to the hook mechanism 20, such as the slider 26 and the hook member 28 may be provided on the keyboard unit 12 (body 2) side. Although not shown, this configuration corresponds to a configuration obtained by exchanging the switch mechanism SM and the hook mechanism 20 with each other in FIGS. 1 to 10 and 12A to 14B.

Further, although the hole 8A is used as the engaging portion to be engaged with the hook member 28 in the above preferred embodiments, any other forms of engaging portion such as a projection, recess, and ring may be used instead.

As described above, according to the present invention, it is possible to provide an information processing device which can prevent an improper switching operation. The other effects by the specific preferred embodiments of the present invention have been described above, so the description thereof will be omitted herein.

The present invention is not limited to the details of the above described preferred embodiments. For example, the present invention is applicable to a device, an equipment, or an apparatus which substantially processes a kind of information, such as a personal digital assistance (PDA) or an electronic pocketbook. These device, equipment and apparatus may constitute a part of the information processing device of the present invention. Furthermore, the present invention is applicable to another electronic device which may not processes an information, such as a device for electronic controlling. The scope of the invention is defined by the appended claims and all changes and modifications as fall within the equivalence of the scope of the claims are therefore to be embraced by the invention.

What is claimed is:

1. An information processing device comprising:

first and second members;

a connecting mechanism connecting said first and second members so that said first and second members can be relatively displaced;

said second member having an engaging portion;

said first member having a hook mechanism maintaining a closed condition of said first member with respect to said second member, said hook mechanism comprising a hook member to be engaged with said engaging portion; and a switch, provided to said second member, switching on and off a signal in response to movement of said hook member.

2. An information processing device according to claim 1, wherein:

said engaging portion is a hole;

said hook mechanism further comprises a slider supporting said hook member so that said hook member is slidable in a direction substantially perpendicular to a direction of insertion of said hook member into said hole;

said switch has a switch member displaceable to determine an on or off state of said switch; and said device further comprises a movable member for transmitting a force exerted by a sliding operation of said hook member to said switch member.

3. An information processing device according to claim 1, wherein:

said engaging portion is a hole;

said switch has a switch member displaceable to determine an on or off state of said switch; and said device further comprises a movable member transmitting a force exerted by an inserting operation of said hook member into said hole.

4. An information processing device according to claim 1, wherein said engaging portion is a hole, and said switch detects said hook member inserted from said hole into said second member.

5. An information processing device according to claim 4, wherein said switch comprises an optical sensor.

6. An information processing device according to claim 1, wherein said first and second members respectively have a display unit and a keyboard unit facing each other when said first member is closed with respect to said second member.

7. An information processing device according to claim 1, wherein:

said first member has a first surface and a second surface;

said second member has a third surface and a fourth surface;

said engaging portion is a hole;

said hole is formed in each of said third surface and said fourth surface; and said connecting mechanism includes two parallel axes each for rotatably supporting said first member so that said first and second members can be relatively displaced between a first condition where said first surface is opposed to said third surface and a second condition where said second surface is opposed to said fourth surface.

8. An information processing device according to claim 7, wherein:

said first member has a display unit on said first surface; and said second member has a keyboard unit on said third surface;

wherein said display unit and said keyboard unit are confined between said first and second members in said first condition, and said display unit and said keyboard unit are oriented outward of said device in said second condition.

9. An information processing device according to claim 7, wherein:

said hook mechanism further comprises a slider slidably provided in said first member;

said hook member is mounted on said slider so as to be rotatable about 90°; and said hook member has a first pawl portion and a second pawl portion substantially perpendicular to each other;

wherein said first pawl portion is engaged with said hole and said second pawl portion is positioned inside said first member in said first condition, and said second pawl portion is engaged with said hole and said first pawl portion is positioned inside said first member in said second condition.

10. An information processing device according to claim 9, wherein said first member further has a spring for biasing said hook member in its rotational direction.

11. An information processing device comprising:

a first member having a display unit;

a second member having a keyboard unit;

a connecting mechanism connecting said first and second members so that said first and second members can be relatively displaced, and allowing said first and second members to be closed with respect to each other in a condition where said display unit and said keyboard unit are opposed to each other;

a hook member as a hook mechanism, provided to said first member, for maintaining a closed condition of said first member with respect to said second member;

an engaging portion, provided to said second member, to be engaged with said hook member; and a switch, provided to said second member, switching on and off a signal in response to movement of said hook member.

12. An information processing device comprising:

a first member having a keyboard unit;

a second member having a display unit;

a connecting mechanism connecting said first and second members so that said first and second members can be relatively displaced, and allowing said first and second members to be closed with respect to each other in a condition where said display unit and said keyboard unit are opposed to each other;

a hook mechanism, provided to said first member, maintaining a closed condition of said first member with respect to said second member;

an engaging portion, provided to said second member, to be engaged with said hook mechanism;

a switch, provided to said second member, switching on and off a signal in response to movement of said hook mechanism.

13. An information processing device according to claim 11 or 12, wherein display control of said display unit and/or control of suspend and resume functions are/is carried out according to said signal.

14. An information processing device according to claim 11 or 12, wherein:

said engaging portion has a hole;

said hook mechanism includes a slider for supporting said hook member so that said hook member is slidable in a direction substantially perpendicular to a direction of insertion of said hook member into said hole;

said switch has a switch member displaceable to determine an on or off state of said switch; and said device further comprises a movable member for transmitting a force exerted by a sliding operation of said hook member to said switch member.

15. An information processing device according to claim 11 or 12, wherein:

said engaging portion has a hole;

said switch has a switch member displaceable to determine an on or off state of said switch; and said device further comprises a movable member for transmitting a force exerted by an inserting operation of said hook member into said hole.

16. An information processing device according to claim 11 or 12, wherein:
said engaging portion has a hole; and
said switch detects said hook member inserted from said hole into said second member.

17. An information processing device according to claim 16, wherein said switch comprises an optical sensor.

18. An information processing device comprising:
a first member having a first surface and a second surface;
a second member having a third surface and a fourth surface;
a connecting mechanism connecting said first and second members so that said first and second members can be relatively displaced between a first condition where said first surface is opposed to said third surface and a second condition where said second surface is opposed to said fourth surface, said connecting mechanism comprising two parallel axes each for rotatably supporting said first member;
a hook member as a hook mechanism provided in said first member for maintaining a closed condition of said first member with respect to said second member;
an engaging portion provided in said second member for being engaged with said hook member; and
a switch, provided to said second member, switching on and off a signal in response to movement of said hook member.

19. An information processing device according to claim 18, wherein:
said device is either a device having a display unit on said first surface of said first member and a keyboard unit on said third surface of said second member or a device having a keyboard unit on said first surface of said first member and a display unit on said third surface of said second member;
wherein said display unit and said keyboard unit are confined between said first and second members in said first condition, and said display unit and said keyboard unit are oriented outward of said device in said second condition.

20. An information processing device according to claim 18, wherein display control of said display unit and/or control of suspend and resume functions are/is carried out according to said signal.

21. An information processing device according to claim 18, wherein:
said hook mechanism has a slider slidably provided in said first member;
said hook member is mounted on said slider so as to be rotatable about 90°; and
said hook member has a first pawl portion and a second pawl portion substantially perpendicular to each other;
wherein said first pawl portion is engaged with said engaging portion and said second pawl portion is positioned inside said first member in said first condition, and said second pawl portion is engaged with said engaging portion and said first pawl portion is positioned inside said first member in said second condition.

22. An information processing device according to claim 21, wherein said first member further has a spring for biasing said hook member in its rotational direction.

23. An electronic device comprising:
a first member having a display portion;
a second member having an input portion;
a connecting mechanism connecting said first and second members so that said first and second members can be relatively displaced, and allowing said first and second members to be closed with respect to each other in a condition where said display portion and said input portion are opposed to each other;
an engaging mechanism maintaining a closed condition of said first member with respect to said second member; and
an outputting unit outputting a signal in accordance with movement of said engaging mechanism.

24. An electronic device according to claim 23, wherein display control of said display portion and/or control of suspend and resume functions are/is carried out in accordance with said signal.

25. An electronic device according to claim 23, wherein said engaging mechanism comprises a first engaging portion positioned on one of said first and second members, and a second engaging portion positioned on the other of said first and second members, said second engaging portion being engaged with said first engaging portion.

26. An electronic device according to claim 25, wherein said outputting unit outputs said signal relevantly to a movement of said first engaging portion.

27. An electronic device according to claim 26, wherein said outputting unit is provided on the same member on which said second engaging portion is provided.

28. An electronic device according to claim 25, wherein said first engaging portion comprises a hook member, and said second engaging portion is engaged with said hook member.

29. An electronic device according to claim 23, wherein said outputting unit comprises a switch.

30. An electronic device comprising:
a first member having a first surface and a second surface;
a second member having a third surface and a fourth surface;
a connecting mechanism connecting said first and second members so that said first and second members can be relatively displaced between a first condition where said first surface is opposed to said third surface and a second condition where said second surface is opposed to said fourth surface;
an engaging mechanism maintaining a closed condition of said first member with respect to said second member; and
an outputting unit outputting a signal in accordance with movement of said engaging mechanism.

31. An electronic device according to claim 30, wherein;
said first member having a display portion on said first surface; and
said second member having an input portion on said third surface;
wherein said display portion and said input portion are opposed to each other in said first condition, and said display portion and said input portion are oriented outward of said device in said second condition.

32. An electronic device according to claim 31, wherein display control of said display portion and/or control of suspend and resume functions are/is carried out in accordance with said signal.

33. An electronic device according to claim 30, wherein said engaging mechanism comprises a first engaging portion positioned on said first member and a second engaging portion positioned on said second member, said second engaging portion being engaged with said first engaging portion.

34. An electronic device according to claim 33, wherein said outputting unit outputs said signal relevantly to a movement of said first engaging portion.

35. An electronic device according to claim 34, wherein said outputting unit is provided on said second member.

36. An electronic device according to claim 33, wherein said first engaging portion operates selectively in a direction toward one of said first and second surfaces.

37. An electronic device according to claim 33, wherein:
said first engaging portion has a first engaging member and a second engaging member; and
said first engaging portion can be displaced between a third condition where said first engaging member is positioned on a side of said first surface and a fourth condition where said second engaging member is positioned on a side of said second surface.

38. An electronic device according to claim 37, further comprising a biasing portion biasing said first engaging portion toward said third condition.

39. An electronic device according to claim 37, wherein said first and second engaging members are provided so as to be substantially perpendicular to each other, and said engaging portion is rotatable about 90°.

40. An electronic device according to claim 39, further comprising a biasing member biasing said first engaging portion in its rotational direction.

41. An electronic device according to claim 30, wherein said connecting mechanism has two axes for rotatably supporting said first and second members.

42. An electronic device according to claim 30, further comprising a display device provided on said first surface.

43. An electronic device according to claim 30, further comprising an input device provided on said third surface.

44. An electronic device according to claim 30, further comprising a touch input device provided on said first surface.

45. An electronic device according to claim 37, wherein said first engaging portion comprises a hook member, and said first and second engaging member are a first pawl portion and a second pawl portion, respectively.

46. An electronic device according to claim 45, wherein said second engaging porion has a hole portion with which said hook member is engaged, said hole portion being provided on said second member.

47. An electronic device according to claim 30, wherein said outputting unit comprises a switch.

* * * * *